July 7, 1931. J. ROBINSON 1,813,125
AUTOMATIC TRAIN PIPE CONNECTER
Original Filed March 29, 1924

INVENTOR.
Joseph Robinson,
BY
ATTORNEY.

Patented July 7, 1931

1,813,125

UNITED STATES PATENT OFFICE

JOSEPH ROBINSON, OF NEW YORK, N. Y.

AUTOMATIC TRAIN PIPE CONNECTER

Application filed March 29, 1924, Serial No. 702,832. Renewed July 11, 1928.

My invention relates to improvements in automatic train pipe connecters and more particularly to improved means for flexibly attaching a metallic hose pipe to a connecter in lieu of the rubber hose now generally used. I am aware that I am not the first to attach flexible metallic tubing to a connecter, but I provide an improved means for accomplishing this whereby the improvement permits maximum flexibility for the metallic base and permits the lower end thereof to be removed and replaced from and in the connecter head while the latter remains coupled to a mating head. In this manner provision is made for the removal of defective gaskets without first parting the cars. Novel means for securing the lower end of the hose in the connecter head is also provided.

My invention is described in the following specification, pointed out in the appended claims and illustrated in the accompanying drawings in which Figure 1 is a sectional horizontal view of my improvement, the connecter head being shown in dotted lines.

Figure 1:
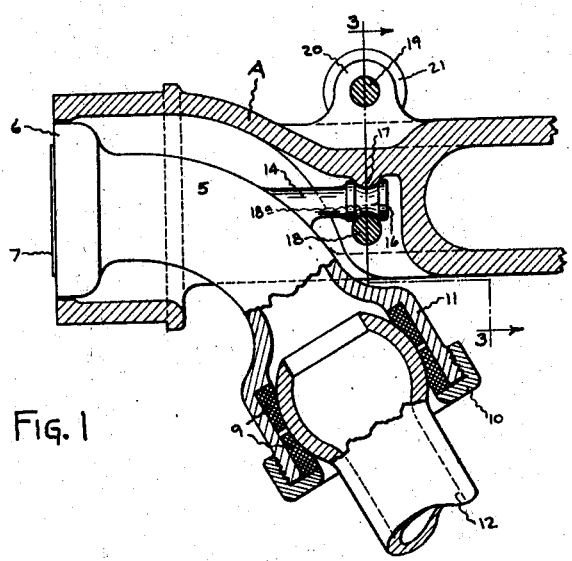

Referring to the drawings: A suitable type of coupling head, and any desired means for supporting the head with respect to the car may be employed with my invention. I show a satisfactory form of coupling head and supporting means in my co-pending application, Serial 490,340, filed August 6th, 1921. My present invention is an improvement on a part of the construction shown in that application, and consists in providing a suitable pipe or member A, such as shown in the aforesaid application, and mounting in the forward hollow end thereof a fitting or conduit 5, which extends out of the member A and to one side thereof. The inner or front end 6 of the fitting carries a gasket 7, disposed in approximately the plane of the coupling head (not shown) used with my improvement. The rear or outer end of the fitting terminates in a conventional form of ball and socket joint, comprising a ball member 8 and suitable packing means 9, the packing being compressed around a part of the outer surface of the ball 8 through the medium of a clamp nut 10, fitted to the rear end 11 of the fitting 5. It will be observed that the ball 8 is formed integral with a metallic pipe or hose 12, although it may, of course, be otherwise connected if desired. The packing material 9 may be of any suitable composition such as that generally used for packing air or steam joint, and if desired the ordinary rubber hose commonly used on railway cars may be suitably attached to the ball 8 in lieu of the pipe 12. Preferably however, I construct the parts in the manner shown, inasmuch as the arrangement produces a complete metallic hose or tubing running from the train pipe of the car to the base of the connecter head, and this is of great advantage since it entirely eliminates the rubber hose.

Figures 3, 4:
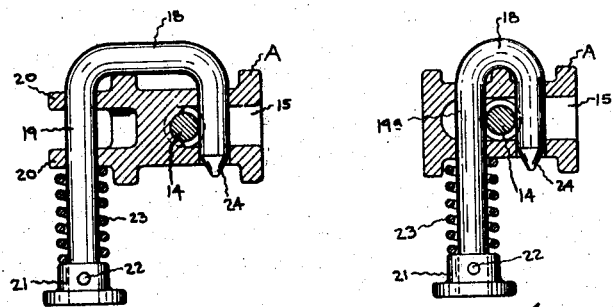
Figure 3 is a sectional view taken on approximately the line 3—3 of Figure 1.
Figure 4 is a view similar to Figure 3 showing a modification of my improved locking means.

As aforesaid flexible metallic hose pipes have heretofore been used in connection with automatic connecters, but in most cases such use has not proved satisfactory, due mainly to the inability of the pipe or flexible joint to give sufficient flexibility to accommodate the various movements of the connecter. Flexibility is most desired at the joint nearest the connecter. I remove these objections and provide the desired flexibility by mounting the fitting 5 rotatably in the forward hollow end of the member A. This I accomplish by providing a shank 14 on the fitting 5, and extending it rearwardly into a way or groove 15 formed in the member A on the side thereof which is nearest the ball and socket joint. The shank 14 has a semi-circular groove 16 formed therein, and this rests between complementary surfaces 17 and 18a formed, respectively, on the member A and on the latch 18. To rotatably secure the fitting 5 in the service position shown in Figure 1, and to permit its ready removal from and insertion in the hollow end of the member A, I provide a latch or lock 18 formed of suitable material such as iron or steel. The latch is roughly U shaped in side view and passes downwardly through the member A as shown in Figure 3. The outer part 19 of the latch passes downwardly through brackets or seats 20 formed on a side of the member A. On the lower end of the part 19 I provide a suitable head 21 which is secured to the latch 18 in any desired manner as by a pin 22. Between the head 21, and the lower bracket or seat 20, I provide a suitable coiled spring 23, which serves to hold the latch 18 firmly in the downward locked position to maintain the fitting 5 in place. When the spring 23 is compressed solid, as by pushing upwardly on the head 21, the lower tapered end 24 of the latch will have been lifted upwardly out of the way of the shank 14 of the fitting 5 whereupon the fitting may be removed from the member A and the defective gasket replaced and the fitting reinserted. In like manner quick and ready repair to the universal joint may be effected. Other forms of attaching universal joints to connecters requires that the parts be unscrewed or taken apart in order to get at the joint or to remove the hose or pipe 12. My improvement permits of easy and ready disconnection of the joint from the connecter, and of the metallic hose from the train pipe of the car. The surfaces 17 and 18a fit into the groove 16 of the shank 14 and serve as an abutment to prevent the fitting 5 shifting rearwardly in the member or shank A under the pressure of the fluid carried. The fitting is positioned vertically by the walls of the groove 15.

Figure 2:
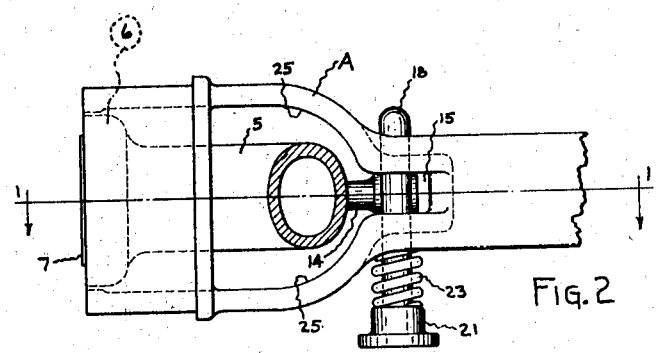
Figure 2 is a sectional side view thereof with the universal joint omitted.

Reference to Figure 2 shows that the fitting or conduit 5 may rotate about the axis of the member A within the limits of the walls 25, thus materially adding to the flexibility obtained by the ball and socket joint 8 and providing great flexibility to the pipe 12. It will be understood, of course, that any desired number of the joints 8 may be used in forming a flexible metallic hose for use with my invention.

In Figure 4 I show a modification of my improved latch 18, wherein the part 19a thereof replaces the wall 17 of the member A. This eliminates the seats 20.

What I claim is:

1. In an automatic train pipe connecter, the combination of a coupling head and a suitable support therefor, of means for yieldingly connecting a flexible hose pipe to said connecter, said means comprising a member extending rearwardly from said coupling head and having a hollow portion, a conduit projecting into said portion, and means for rotatably securing said conduit in place.

2. In an automatic train pipe connecter, the combination with a coupling head and a suitable support therefor, of means for yieldingly attaching a flexible metallic hose pipe to said connecter, said means comprising a member extending rearwardly from the head and having a hollow portion, a conduit extending into said portion and provided with a shank, means on said member for cooperating with said shank, to position said conduit vertically, and means for locking the conduit in said member and for permitting limited rotation thereof in the member whereby maximum flexibility of said hose pipe is obtained.

3. In an automatic train pipe connecter, the combination of a coupling head and suitable support therefor, said support including a member extending rearwardly from the head and having a hollow portion, a conduit extending into said portion and provided with a shank cooperating with said member to position the conduit vertically, means to prevent undue axial shifting of the conduit with respect to said member while permitting rotation of the conduit in the member, and a suitable hose pipe connected to one end of said conduit.

4. In an automatic train pipe connecter, the combination of a coupling head and suitable support therefor comprising a rearwardly extending member having a hollow portion, a conduit mounted in said portion for limited rotation and having at one end a ball and socket joint and at the other end a suitable gasket, means for removably locking said conduit in said member and for permitting limited rotation thereof with respect to said member, whereby said conduit may be removed from and replaced in said member while said coupling head remains coupled to a mating head.

5. In an automatic train pipe connecter, the combination of a coupling head and suitable support therefor including a rearwardly extending hollow member, a conduit projecting into said member and having a gasket disposed in substantially the plane of the coupling face of said head, said conduit being flexibly connected at the other end to a metallic hose pipe and means for removably securing the conduit in the member, said means including a vertically shiftable latch adapted to embrace a part of the said conduit.

6. An automatic train pipe connecter comprising in combination a coupling head and a suitable support therefor including a rearwardly extending hollow shank, a curved conduit mounted in said shank and having at its rear end a ball and socket joint provided with a suitable packing, said joint including a part spherical member, a hose pipe connected to said member, and cooperating means on said conduit and shank for rotatably securing the conduit in the shank.

7. An automatic train pipe connecter, comprising the combination of a coupling head and a suitable support therefor including a rearwardly extending hollow shank, a conduit projecting into said shank and means for removably maintaining said conduit therein, said means comprising a part on said fitting supported against vertical movement by a seat formed in said shank, and a vertically shiftable latch spanning said part for securing said fitting in place and for permitting removable and replacement thereof while said coupling head remains coupled to a mating head.

8. An automatic train pipe connecter, the combination with a coupling head and a member on which the head is mounted, of a hollow fluid conduit extending into said head and member and carrying at the one end a gasket and being connected at the other end to a hose pipe, a shank on said conduit, means for removably maintaining said conduit in said head and members, said means comprising a reciprocal latch which spans said shank and extends downwardly below said member and means for yieldingly maintaining said latch in locked position.

9. An automatic train pipe connecter comprising in combination, a coupling head and a suitable support therefor including a rearwardly extending shank having a hollow forward end, a curved fitting extending out of said hollow forward end and having a gasket, a projection on said fitting cooperating with a seat on said shank to vertically position the fitting, a latch for removably locking said fitting in said shank, said latch comprising a part which embraces said projection and extends downwardly through a seat formed on said shank, a head or knob on said latch and a spring interposed between the knob and said seat for yieldingly securing said latch in the service position and for limiting the upward movement thereof, whereby said fitting may be removed and replaced with respect to said shank at will while said coupling head remains coupled to a mating head.

10. An automatic train pipe connecter comprising in combination, a coupling head having an opening therein and a support extending rearwardly therefrom, a conduit having its front end mounted in said opening and extending rearwardly therefrom, means for rotatably locking said conduit in said opening and a train pipe connected to the rear end of said conduit.

11. An automatic train pipe connecter comprising in combination, a coupling head having an opening and also having a portion extending rearwardly therefrom, a conduit having its front end rotatably supported in said opening in the head and means for rotatably locking said conduit to said rearwardly extending portion, whereby said conduit may be rotated in said opening, and means for limiting the extent of said rotation.

12. An automatic train pipe connecter comprising in combination, a coupling head having a portion extending rearwardly therefrom, a conduit having its front end mounted in an opening in said head, a shank extending rearwardly from said conduit and rotatably locked to said rearwardly extending portion, whereby rotation of said conduit in said opening is permitted and means for limiting the extent of such rotation.

13. An automatic train pipe connecter, comprising in combination, a coupling head having an opening therein, a conduit extending into said opening and removable rearwardly therefrom while said head is coupled to a mating head, means for holding said conduit in the head, said means comprising a part carried by the head and a part carried by the conduit, the latter being rotatable relative to the former while the conduit is held in the head.

In testimony whereof I hereunto affix my signature.

JOSEPH ROBINSON.